United States Patent
Sasaki et al.

(10) Patent No.: US 12,508,663 B2
(45) Date of Patent: Dec. 30, 2025

(54) COATED TOOL

(71) Applicants: MOLDINO TOOL ENGINEERING, LTD., Tokyo (JP); Oerlikon Surface Solutions AG, Pfaffikon, Pfaffikon (CH)

(72) Inventors: Tomoya Sasaki, Yasu (JP); Kazuyuki Kubota, Narita (JP); Kumar Yalamanchili, Sargans (CH); Denis Kurapov, Walenstadt (CH); Wolfgang Kalss, Feldkirch (AT)

(73) Assignees: MOLDINO Tool Engineering, Ltd., Tokyo (JP); Oerlikon Surface Solutions AG, Pfaffikon, Pfaffikon (CH)

(*) Notice: Subject to any disclaimer, the term of this patent is extended or adjusted under 35 U.S.C. 154(b) by 271 days.

(21) Appl. No.: 18/269,299

(22) PCT Filed: Feb. 9, 2022

(86) PCT No.: PCT/JP2022/005117
§ 371 (c)(1),
(2) Date: Jun. 23, 2023

(87) PCT Pub. No.: WO2022/172954
PCT Pub. Date: Aug. 18, 2022

(65) Prior Publication Data
US 2024/0227041 A1    Jul. 11, 2024

(30) Foreign Application Priority Data
Feb. 12, 2021  (JP) .................... 2021-020682

(51) Int. Cl.
*B23C 5/16* (2006.01)
*C23C 14/06* (2006.01)
(Continued)

(52) U.S. Cl.
CPC ............ *B23C 5/16* (2013.01); *C23C 14/0617* (2013.01); *C23C 14/0664* (2013.01);
(Continued)

(58) Field of Classification Search
None
See application file for complete search history.

(56) References Cited

U.S. PATENT DOCUMENTS

2002/0168552 A1    11/2002  Yamamoto et al.
2011/0117344 A1*    5/2011  Chen ................. C23C 14/0641
                                                                501/98.4
(Continued)

FOREIGN PATENT DOCUMENTS

CN    102198519 A    9/2011
CN    102794492 A    11/2012
(Continued)

OTHER PUBLICATIONS

International Search Report mailed Mar. 29, 2022, issued for PCT/JP2022/005117 and English translation thereof.
(Continued)

*Primary Examiner* — Seth Dumbris
(74) *Attorney, Agent, or Firm* — Troutman Pepper Locke LLP

(57) ABSTRACT

A coated tool of the present invention includes a base material; and a hard coating film on the base material. The hard coating film is a nitride or carbonitride which contains aluminum (Al) of 65 atomic % or more and 90 atomic % or less and titanium (Ti) of 10 atomic % or more and 35 atomic % or less with respect to a total amount of metal (including metalloid) elements, and have a face-centered cubic structure. In the X-ray intensity distribution of the α axis of the positive pole figure with respect to the (111) plane of the face-centered cubic structure, the hard coating film have a
(Continued)

maximum intensity Ia in the α angle range of 80° to 90° and an intensity in the α angle range of 0° to 70° is 30% or less of the Ia.

20 Claims, 6 Drawing Sheets

(51) Int. Cl.
    *C23C 14/34*     (2006.01)
    *C23C 14/02*     (2006.01)

(52) U.S. Cl.
    CPC ...... *C23C 14/3414* (2013.01); *B23C 2224/22* (2013.01); *B23C 2224/24* (2013.01); *B23C 2224/32* (2013.01); *B23C 2224/36* (2013.01); *C23C 14/022* (2013.01)

(56) References Cited

U.S. PATENT DOCUMENTS

| | | |
|---|---|---|
| 2016/0053372 A1 | 2/2016 | Stiens et al. |
| 2019/0062924 A1 | 2/2019 | Czettel et al. |
| 2020/0230705 A1 | 7/2020 | Sasaki |
| 2021/0138558 A1 | 5/2021 | He et al. |
| 2022/0176462 A1* | 6/2022 | Yamasaki ............. C23C 30/005 |

FOREIGN PATENT DOCUMENTS

| | | |
|---|---|---|
| JP | 2003-117705 A | 4/2003 |
| JP | 2006-316351 A | 11/2006 |
| JP | 2009-203485 A | 9/2009 |
| JP | 2015-037834 A | 2/2015 |
| JP | 2015-110256 A | 6/2015 |
| JP | 2016-522323 A | 7/2016 |
| JP | 2019-520992 A | 7/2019 |
| WO | 2018/001784 A1 | 1/2018 |
| WO | 2019/065397 A1 | 4/2019 |
| WO | 2019/146711 A1 | 8/2019 |

OTHER PUBLICATIONS

International Preliminary Report on Patentability mailed Jan. 10, 2023, issued for PCT/JP2022/005117 and English translation thereof.
Office Action mailed May 28, 2025, issued for CN202280010646.0 and English translation of the Search Report.
Supplementary European Search Report mailed Jun. 24, 2025, issued for EP22751244.9.

* cited by examiner

COATED TOOL

TECHNICAL FIELD

The present invention relates to a coated tool applied to a tool such as a mold or a cutting tool.

Priority is claimed on Japanese Patent Application No. 2021-020682, filed Feb. 12, 2021, the content of which is incorporated herein by reference.

BACKGROUND ART

Al and Ti nitride or carbonitride (hereinafter, referred to as AlTiN or AlTiCN) are film types with excellent wear resistance and heat resistance, and are widely applied to coated molds and coated cutting tools. By the way, it has been proposed to control the crystal orientation in order to improve the property of the hard coating film. For example, in Patent Document 1, it is proposed that a coated tool having AlTiN film in which (200) plane is oriented in a particular direction.

CITATION LIST

Patent Document

[Patent Document 1]
International Publication No. 2019/146711

SUMMARY OF THE INVENTION

Problems to be Solved by the Invention

In AlTiN and AlTiCN, when Al content increases, the amount of AlN having a hexagonal closest packed structure (hcp structure) increases, and the coating hardness and tool performance tend to deteriorate. The inventor have found that a coated tool provided with Al-rich AlTiN or AlTiCN may reach the tool life early in machining high-hardness steel, and that there is room for improvement in durability.

In view of the above-described circumstances, an object of the present invention is to provide a coated tool having excellent durability.

Means for Solving the Problem

According to one aspect of the present invention, provided is a coated tool including: a base material; and a hard coating film on the base material, wherein the hard coating film is a nitride or carbonitride which contains aluminum (Al) of 65 atomic % or more and 90 atomic % or less and titanium (Ti) of 10 atomic % or more and 35 atomic % or less with respect to a total amount of metal (including metalloid) elements, and have a face-centered cubic structure, and wherein, in the X-ray intensity distribution of the $\alpha$ axis of the positive pole figure with respect to the (111) plane of the face-centered cubic structure, the hard coating film have a maximum intensity Ia in the $\alpha$ angle range of 80° to 90° and an intensity in the $\alpha$ angle range of 0° to 700 is 30% or less of the Ia.

It is preferable that the intensity in the $\alpha$ angle range of 0° to 70° is 20% or less of the Ia.

It is preferable that, in the hard coating film, a peak intensity of the (111) plane of face-centered cubic lattice structure exhibits maximum intensity in the intensity profile of an X-ray diffraction or limited field diffraction pattern of transmission electron microscopy.

It is preferable that the hard coating film has no peaks other than in the $\alpha$ angle range of 80° to 900 in the X-ray intensity distribution of the $\alpha$ axis of the positive pole figure with respect to the (111) plane of the face-centered cubic lattice structure.

It is preferable that, in the X-ray intensity distribution of the $\alpha$ axis of the positive pole figure with respect to the (200) plane of the face-centered cubic lattice structure of the hard coating film, the maximum intensity Ib is exhibited in the $\alpha$ angle range of 20° to 50°.

It is preferable that, in the X-ray intensity distribution of the $\alpha$ axis of the positive pole figure with respect to the (200) plane of the face-centered cubic lattice structure of the hard coating film, no peaks are exhibited other than in the $\alpha$ angle range of 20° to 50°.

It is preferable that the hard coating film contains 0.20 atomic % or less of argon (Ar) with respect to a total amount of metal and non-metallic elements. The argon content may be 0.10 atomic % or less. The argon content may be 0.03 atomic % or more.

It is preferable that the hard coating film has compressive residual stress.

It is preferable that the hard coating film has 5 or less droplets having a circular equivalent diameter of 1 μm or more per 100 μm² in cross-sectional observation. More preferably, the number of the droplets is 3 or less per 100 μm². Further preferably, the number of the droplets is 1 or less per 100 μm². Furthermore, it is preferable that the hard coating film do not contain droplets having a circular equivalent diameter of 5 μm or more.

The hard coating film may have an Al content of 70 atomic % or more when the total metal element is 100 atomic %. The Al content may be 72 atomic % or more. The Al content may be 75 atomic % or more. The Al content may be 85 atomic % or less.

The hard coating film may have a Ti content of 15 atomic % or more when the total metal element is 100 atomic %. The Ti content may be 30 atomic % or less. The Ti content may be 28 atomic % or less. The Ti content may be 25 atomic % or less.

The hard coating film may have a total Al and Ti content of 90 atomic % or more when the total metal element is 100 atomic %. The hard coating film may be an Al and Ti nitride or an Al and Ti carbonitride.

Effects of the Invention

According to the present invention, it is possible to obtain a coated tool having excellent durability.

EMBODIMENTS OF THE INVENTION

Figure 1:
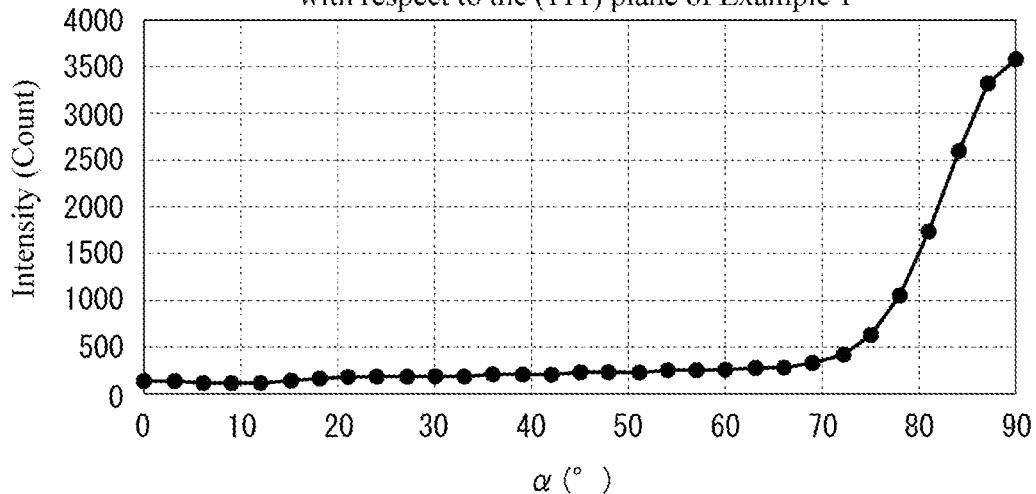
FIG. 1 is an example of an X-ray intensity distribution of the $\alpha$ axis of the positive pole figure with respect to the (111) plane in AlTiN of Example 1.

The present inventor has found that for nitrides or carbonitrides mainly composed of Al-rich Al and Ti, the durability tends to improve by controlling the orientation of the crystals of the face-centered cubic lattice structure. Hereinafter, the details of the embodiment of the present invention will be described.

The coated tool of this embodiment is a coated tool having a hard coating film mainly composed of Al-rich Al and Ti nitrides or carbonitrides on a surface of a base material. The coated tool of this embodiment can be applied to a mold or a cutting tool. In particular, it is preferable to apply the coated tool to a small-diameter end mill having a tool diameter of 5 mm or less and mom preferably to a small-diameter end mill having 3 mm or less.

In this embodiment, the base material is not particularly limited. Cold work tool steel, hot work tool steel, high-speed steel, cemented carbide, or the like may be appropriately applied according to the application. The base material may be subjected to nitriding treatment, metal bombardment treatment, or the like in advance.

A hard coating film according to this embodiment is a nitride or a carbonitride, contains aluminum (Al) of 65 atomic % or more and 90 atomic % or less and titanium (Ti) of 10 atomic % or more and 35 atomic % or less with respect to a total amount of metal (including metalloid) elements. The nitride or carbonitride mainly composed of Al and Ti is a film type having an excellent balance between wear resistance and heat resistance, and has excellent adhesion to a base material. The heat resistance of the film is further improved by increasing the Al content ratio. Further, since an oxidation protective film is easily formed on the tool surface and a film structure becomes finer by increasing the Al content ratio, wear of the hard coating film due to welding is easily suppressed.

In order to fully exhibit the effect of adding Al, the hard coating film according to this embodiment has an Al content ratio of 65% atomic % or more when the total metal (including metalloids; the same applies hereinafter) element is 100 atomic %. More preferably, the Al content ratio is 70 atomic % or more. More preferably, the Al content ratio is 72 atomic % or more. More preferably, the Al content ratio is 75 atomic % or more. On the other hand, when the Al content ratio becomes too large, the crystal structure of the hard coating film will change and become brittle. Therefore, the Al content ratio of the hard coating film according to this embodiment is 90 atomic % or less when the total metal element is 100 atomic %. More preferably, the Al content ratio is 85 atomic % or less.

The hard coating film according to this embodiment has a Ti content ratio of 10 atomic % or more when the total metal element is 100 atomic %. Accordingly, excellent wear resistance can be imparted to the hard coating film. More preferably, the Ti content ratio is 15 atomic % or more. On the other hand, when the Ti content ratio of the hard coating film becomes too large, it is difficult to obtain the effect of increasing the Al content ratio. Therefore, the hard coating film according to this embodiment has a Ti content ratio of 35 atomic % or less when the total metal element is 100 atomic %. More preferably, the Ti content ratio is 30 atomic % or less. More preferably, the Ti content ratio is 28 atomic % or less. More preferably, the Ti content ratio is 25 atomic % or less.

The hard coating film according to this embodiment preferably contains a total of Al and Ti of 90 atomic % or more when the total metal element is 100 atomic % in order to impart excellent durability to the coated tool. Further, the hard coating film according to this embodiment may be a nitride or a carbonitride of Al and Ti. Nitride, which is a film type having more excellent heat resistance, is preferable.

The content ratio of the metal element in the hard coating film according to this embodiment can be measured by using an electron probe microanalyzer (EPMA) for the mirror-polished hard coating film. In this case, for example, the content ratio can be obtained from the average of 5 analysis points in the analysis range having a diameter of about 1 μm after mirror-polishing on the hard coating film surface.

The hard coating film according to this embodiment may contain a metal element other than Al and Ti. For example, the hard coating film according to this embodiment may contain elements of groups 4a, 5a, and 6a of the periodic table and one or more elements selected from Si, B, Y, Yb and Cu for the purpose of improving wear resistance and heat resistance. These elements are commonly included to improve the coating property of the coated tool. These elements can be added within a range that does not significantly reduce the durability of the coated tool. However, if the content ratio of metal elements other than Al and Ti becomes too large, the durability of the coated tool may decrease. Therefore, when the hard coating film according to this embodiment contains a metal element other than Al and Ti, the total content ratio is preferably 10 atomic % or less. More preferably, the total content ratio is 5 atomic % or less.

<Crystal Structure>

The hard coating film according to this embodiment has a face-centered cubic lattice structure. And in the X-ray intensity distribution of the α axis of the positive pole figure with respect to the (111) plane of the face-centered cubic lattice structure, the maximum intensity Ia is shown in the α angle range of 80° to 90°, and the intensity in the α angle range of 0° to 70° is 30% or less of the maximum intensity Ia. As a result, the intensity in the α angle range of 0° to 70° is relatively low with respect to the maximum intensity of the α angle range of 80° to 90°, and many of the (111) planes are in the α angle range of 80° to 90° which is almost perpendicular to the base material surface direction. It is considered that the entire of the hard coating film becomes more fine and durable because the (111) plane is oriented in a direction almost perpendicular to the base material surface direction. It is preferable that the intensity in the α angle range of 0° to 70° of the (111) plane is 20% or less of the maximum intensity Ia, and further preferably 15% or less. It is preferable that, in the X-ray intensity distribution of the α axis of the positive pole figure with respect to the (111) plane of the face-centered cubic lattice structure, there are no peaks except in the α angle range of 800 to 90°.

In the hard coating film of the present embodiment, in the intensity profile of the X-ray diffraction or electron diffraction pattern, it is preferable that the (111) plane of the face-centered cubic lattice structure exhibits maximum intensity. It is considered that since the (111) planes of the face-centered cubic lattice structure exhibiting the maximum intensity are oriented in approximately the same direction, durability is improved.

The hard coating film according to this embodiment preferably exhibits a maximum intensity Ib in the α angle range of 20° to 50° in the X-ray intensity distribution of the α axis of the positive pole figure with respect to the (200) plane of the face-centered cubic lattice structure. It is considered that when the (200) planes are also strongly oriented in a specific direction in the hard coating film, the durability is improved. It is preferable that, there are no peaks in the X-ray intensity distribution of the α axis of the positive pole figure with respect to the (200) plane of the face-centered cubic lattice structure except in the α angle range of 20° to 50°.

In the intensity profile of the X-ray diffraction or electron diffraction pattern, the hard coating film according to this embodiment preferably has a peak intensity of the (200) plane of the face-centered cubic lattice structure that is second to the peak intensity of the (111) plane of the face-centered cubic lattice structure.

<Intermediate Film, Upper Layer>

In order to further improve the adhesion of the hard coating film, the coated tool of this embodiment may, if necessary, provide a intermediate film between the base material of the tool and the hard coating film. For example, a layer of either metal, nitride, carbonitride, or carbide may be provided between the base material of the tool and the hard coating film.

In addition, a hard coating film having a composition ratio or a composition different from that of the hard coating film according to this embodiment may be formed on the hard coating film according to this embodiment. Further, a hard coating film according to this embodiment and another hard coating film having a composition ratio or a composition different from the hard coating film according to this embodiment may be laminated to each other.

The hard coating film according to this embodiment preferably has compressive residual stress. Due to the compressive residual stress of the hard coating film, durability of the coated tool is improved. In order to apply compressive residual stress to the hard coating film, it is preferable to coat the hard coating film by an arc ion plating method or a sputtering method, which is a physical vapor deposition method. By applying the sputtering method, the droplet in the hard coating film, which is inevitably included in the arc ion plating method can be reduced, which is preferable.

<Droplet>

The hard coating film according to this embodiment preferably has 5 or less droplets having a circular equivalent diameter of 1 μm or more per 100 μm² in cross-sectional observation. In this specification, the term "droplets" used in the arc ion plating method, means deposits on the hard coating film caused by molten particles of about 1 to several tens of μm ejected from the cathode. In this specification, the term "droplets" used in the sputtering method, means deposits on the hard coating film caused by metal particles of about 1 to several tens of μm that are suddenly scattered from the target.

Droplets can be the main physical defect in the hard coating film coated by physical vapor deposition. In particular, since a coarse droplet having a circular equivalent diameter of 1 μm or more can be a starting point of fracture inside the hard coating film, the toughness of the hard coating film can be increased by reducing the frequency of occurrence. In this embodiment, when observing the cross-section of the hard coating film, it is preferable that the number of droplets having a circular equivalent diameter of 1 μm or more is 5 or less per 100 μm². More preferably, the number is 3 or less per 100 μm². Further preferably, the number is 1 or less per 100 μm². Furthermore, it is preferable not to contain droplets having a circular equivalent diameter of 5 μm or more.

As for the surface of the hard coating film, it is preferable that the number of droplets having a circular equivalent diameter of 1 μm or more is 5 or less per 100 μm². More preferably, the number of droplets on the surface of the hard coating film is 3 or less per 100 μm². Further preferably, the number of droplets on the surface of the hard coating film is 1 or less per 100 μm².

In order to evaluate droplets in cross-sectional observation of the hard coating film, the hard coating film is mirror-polished and then processed by the focused ion beam method to prepare an observation sample. Multiple fields of view on the mirror-polished surface of the observation sample are observed at a magnification of 5,000 to 10,000 times by using a transmission electron microscope. Further, the number of droplets on the surface of the hard coating film can be determined by observing the surface of the hard coating film using a scanning electron microscope (SEM) or the like.

The hard coating film according to this embodiment preferably contains argon (Ar) of 0.20 atomic % or less with respect to the total amount of metal elements and non-metal elements. Droplets, which are defects in the hard coating film, can be reduced in frequency by applying the sputtering method. On the other hand, in the sputtering method, since the target component is sputtered using argon ions, the hard coating film coated by the sputtering method contains a considerable amount of argon. In particular, argon tends to be concentrated at the grain boundaries, and the content ratio of argon tends to increase as the crystal grain size becomes finer. When the content ratio of argon in the hard coating film increases, the bonding force between the particles decreases at the grain boundaries. In a hard coating film having a high Al content, such as the hard coating film according to the present embodiment, argon contained in an excessive amount may cause defects, so it is effective to keep the content below a certain level. Specifically, the hard coating film according to this embodiment preferably contains argon of 0.20 atomic % or less with respect to the total amount of metal elements and non-metal elements. More preferably, the hard coating film of this embodiment contains argon of 0.10 atomic % or less.

Additionally, the hard coating film according to this embodiment may also contain a rare gas other than argon by sputtering using a mixed gas containing a rare gas other than argon.

In the sputtering method, if the argon content ratio of the hard coating film is made as close to 0 atomic % as possible, the flow rate of argon becomes too small and the sputtering becomes unstable. Further, even if the argon content ratio approaches 0 atomic %, the basic characteristics as the hard coating film applied to the tool such as toughness, heat resistance, and wear resistance may be impaired. In the hard coating film according to this embodiment, the lower limit of the argon content ratio is not particularly limited, but it is preferable to contain argon of 0.03 atomic % or more in order to stabilize the sputtering method and secure the basic film characteristics as the hard coating film applied to the coated tool.

Similar to the measurement of the metal element content ratio described above, the content ratio of nitrogen and argon of the hard coating film according to this embodiment can be measured using an electron probe microanalyzer (EPMA) for a mirror-polished hard coating film. Similar to the measurement of the content ratio of the metal element described above, the content ratio can be obtained from the average of 5 analysis points in the analysis range having a diameter of about 1 μm after mirror-polishing.

The hard coating film according to this embodiment may contain small amounts of argon, oxygen, and carbon in addition to nitrogen as non-metal elements.

<Manufacturing Method>

When coating the hard coating film according to this embodiment, a sputtering method is preferably applied in which 3 or more AlTi alloy targets are used, power is applied to the targets in sequence, and a time is provided during which the power is applied to both the target at which the power application ends and the target at which the power application starts at the same time when the target to which the power is applied is switched. In such a sputtering method, a state in which the target ionization rate is high is maintained in the coating, a hard coating film that is fine and dense at the micro level can be obtained, and the amount of argon and oxygen that is inevitably contained tends to be small. Then, it is preferable that the temperature inside the sputtering apparatus is 200° C. to 400° C., the bias voltage of the negative pressure applied to the base material is −200V to −70V, and the pressure inside the furnace is 0.1 Pa to 0.4 Pa by introducing Ar gas and $N_2$ gas. Further, when coating carbonitride as a hard coating film, a small amount of carbon may be added to the target for forming the hard coating film or a part of the reaction gas may be replaced with hydrocarbon gas such as methane gas.

The maximum power density of the power pulse is preferably 1.0 kW/cm$^2$ or more. However, if the power density applied to the target becomes too large, it will be difficult to stabilize the film formation. Further, if the power density becomes too high, the frequency of droplet generation tends to increase even in the sputtering method. Therefore, the maximum power density of the power pulse is preferably 2.0 kW/cm$^2$ or less. The time of the power pulse applied to each target is preferably 200 microseconds or more. Further, it is preferable that the time during which the electric power is simultaneously applied to both the alloy target at which the application of electric power is completed and the alloy target at which the application of electric power is started is 5 microseconds or more and 20 microseconds or less.

Example 1

<Base Material>

As the base material, a two-flute ball end mill (manufactured by MOLDINO Co., Ltd.) made of cemented carbide having a composition of WC (bal.)-Co (8.0% by mass)-VC (0.3% by mass)-$Cr_3C_2$ (0.5% by mass) and hardness 94.0HRA (Rockwell hardness, according to JIS G0202) was prepared.

In the film formation of the hard coating film in Examples 1, 2 and Comparative Examples 1, 3, a sputtering apparatus capable of mounting 6 sputtering evaporation sources was used. In these vapor deposition sources, three AlTi alloy targets (see Table 1. In this specification, the number of alloy compositions is atomic ratio; the same shall apply hereinafter) were installed in the apparatus as vapor deposition sources in order to coat the hard coating film. In Comparative Example 1, three Al60Ti40 alloy targets were installed in the apparatus as vapor deposition sources in order to coat the intermediate film.

A tool as a base material was fixed to the sample holder in the sputtering apparatus, and the bias power supply was connected to the tool. Additionally, the bias power supply has a structure in which a negative bias voltage is applied to the tool independently of the target. The tool rotates at two revolutions per minute and revolves via a fixing jig and a sample holder. The distance between the tool and surface of the target was set to 100 mm.

As the introduction gas, Ar and $N_2$ were used, and the introduction gas was introduced from the gas supply port provided in the sputtering apparatus.

<Bombardment Treatment>

First, before coating the tool with a hard coating film, the tool was subjected to a bombardment treatment according to the following procedure. Heating was performed for 30 minutes in a state in which the temperature inside the furnace was 430° C. by the heater in the sputtering apparatus. After that, the inside of the furnace of the sputtering apparatus was evacuated, and the pressure inside the furnace was set to $5.0 \times 10^{-3}$ Pa or less. Then, Ar gas was introduced into the furnace of the sputtering apparatus, and the pressure inside the furnace was adjusted to 0.8 Pa. Then, a DC bias voltage of −170 V was applied to the tool to perform cleaning (bomberd treatment) of the tool with Ar ions for 20 minutes or more.

<Coating of Hard Coating Film>

In Example 1, a hard coating film was coated on the surface of the base material after the bombardment treatment. The temperature inside the furnace was set to 200° C., and Ar gas (0.2 Pa) and $N_2$ gas (0.1 Pa) were introduced into the furnace of the sputtering apparatus to set the pressure inside the furnace to 0.3 Pa. A DC bias voltage was applied to the base material. The overlap time of the electric power applied to each target was set to 10 microseconds. The discharge time per cycle of electric power applied to each target was set to 10 milliseconds. Then, a negative bias voltage applied to the base material was set to −100V and a maximum power was set to 1.5 Kw/cm$^2$, electric power was continuously applied to the three Al80Ti20 alloy targets to coat the surface of the base material with a hard coating film of about 3.0 μm.

In Example 2, a hard coating film was coated on the surface of the base material after the bombardment treatment. The temperature inside the furnace was set to 300° C., and Ar gas (0.1 Pa) and $N_2$ gas (0.04 Pa) were introduced into the furnace of the sputtering apparatus to set the pressure inside the furnace to 0.14 Pa. A DC bias voltage was applied to the base material. The overlap time of the electric power applied to each target was set to 10 microseconds. The discharge time per cycle of electric power applied to each target was set to 10 milliseconds. Then, a negative bias voltage applied to the base material was set to −100V and a maximum power was set to 1.5 Kw/cm$^2$, electric power was continuously applied to the three Al75Ti25 alloy targets to coat the surface of the base material with a hard coating film of about 3.0 μm.

In Comparative Example 1, after the bombardment treatment, an intermediate film made of nitride having a thickness of about 0.2 μm was coated, and then a hard coating film was coated under the same conditions as Example 1.

In Comparative Example 3, a hard coating film was coated on the surface of the base material after the bombardment treatment. The temperature inside the furnace was set to 200° C., and Ar gas (0.1 Pa) and $N_2$ gas (0.07 Pa) were introduced into the furnace of the sputtering apparatus to set the pressure inside the furnace to 0.17 Pa. A DC bias voltage was applied to the base material. The overlap time of the electric power applied to each target was set to 10 microseconds. The discharge time per cycle of electric power applied to each target was set to 10 milliseconds. Then, a negative bias voltage applied to the base material was set to −80V and a maximum power was set to 1.5 Kw/cm², electric power was continuously applied to the three Al80Ti20 alloy targets to coat the surface of the base material with a hard coating film of about 3.0 μm.

An arc ion plating apparatus was used to form the hard coating film of Comparative Example 2. An Al65Ti35 alloy target was installed in the apparatus as a vapor deposition source. First, the tool was cleaned (bombardment treatment) with Ar ions. Next, the pressure inside the arc ion plating apparatus was evacuated to $5.0 \times 10^{-3}$ Pa or less, the temperature inside the furnace was set to 500° C., and $N_2$ gas was introduced so that the pressure inside the furnace was 3.2 Pa. Next, a DC bias voltage of −100V was applied to the base material, and a current of 150 A was applied to the Al65Ti35 alloy target to coat the surface of the tool with a hard coating film of about 3.0 μm.

The film composition of the hard coating film was measured by the attached wavelength dispersive electron probe microanalysis (WDS-EPMA) using an electron probe microanalyzer device (JXA-8500F manufactured by JEOL Ltd.). The mirror-polishing of the ball end mill for physical property evaluation was performed. An acceleration voltage was set to 10 kV, an irradiation current was set to $5 \times 10^{-8}$ A, and an uptake time was set to 10 seconds. 5 points in the range of the analysis region having a diameter of about 1 μm were measured, and from the average value of them, the metal content ratio and the argon content ratio of the hard coating film with respect to the total of the metal component and the non-metal component were determined. It was confirmed that the hard coating film coated by the sputtering method contained 0.05 to 0.1 atomic % of Ar.

The measurement conditions for the X-ray intensity distribution were as follows. The α angle is 90° when the normal to the sample surface is on the plane determined by the incident beam and the diffraction beam. When the α angle is 90°, it becomes the central point on the positive pole figure.

bulb: CuKα rays
Output: 45 kV, 200 mA
Beam: parallel method
Optics: In-plane
Detector: D/teX Ultra 250
Solar slit opening angle: 0.5 deg
Incident slit width: 1.0 mm
Light receiving slit width: 1.0 mm
Scanning Method: Concentric Circle
β Scan Range: 0° to 360°/3.0° Step
2θ fixed angle: The diffraction angle of the (111) plane is an angle at which the diffraction intensity is the highest in the range of 36.0° to 39.0°. The diffraction angle of the (200) plane is an angle at which the diffraction intensity is the highest in the range of 42.0° and 45.0°.
α Scan Range: 0 to 90°/3.0° Step

TABLE 1

| Sample No. | Composition (atomic %) | (111) plane | | Maximum intensity in the α angle range of 0° to 70° | (200) plane | |
|---|---|---|---|---|---|---|
| | | Maximun peak angle (α°) | Maximun peak intensity | | Maximun peak angle (α°) | Maximun peak intensity |
| Example 1 | (Al80Ti20)N | 90 | 3562 | 330 | 33 | 2684 |
| Example 2 | (Al72Ti28)N | 90 | 859 | 233 | 42 | 394 |
| Comparative Example 1 | (Al80Ti20)N | 48 | 336 | 336 | 90 | 526 |
| Comparative Example 2 | (Al60Ti40)N | 33 | 450 | 450 | 18 | 851 |
| Comparative Example 3 | (Al77Ti23)N | 46 | 218 | 218 | 84 | 180 |

Figure 3:
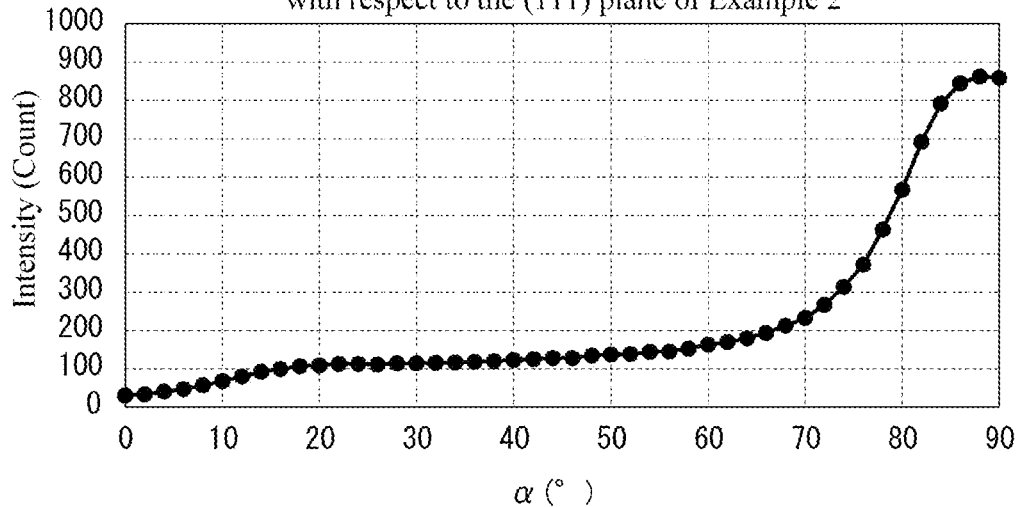
FIG. 3 is an example of an X-ray intensity distribution of the $\alpha$ axis of the positive pole figure with respect to the (111) plane in AlTiN of Example 2.
Figure 5:
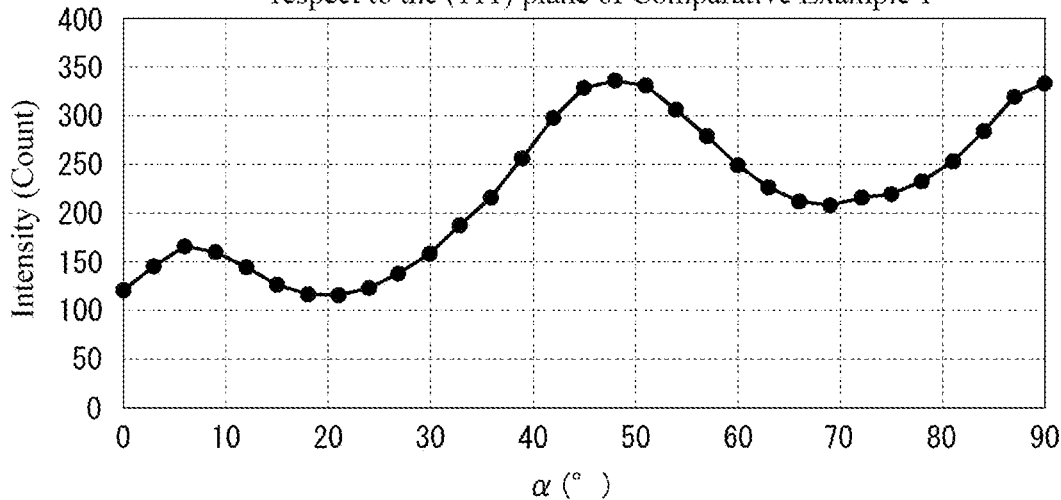
FIG. 5 is an example of an X-ray intensity distribution of the $\alpha$ axis of the positive pole figure with respect to the plane (111) in AlTiN of Comparative Example 1.
Figure 7:
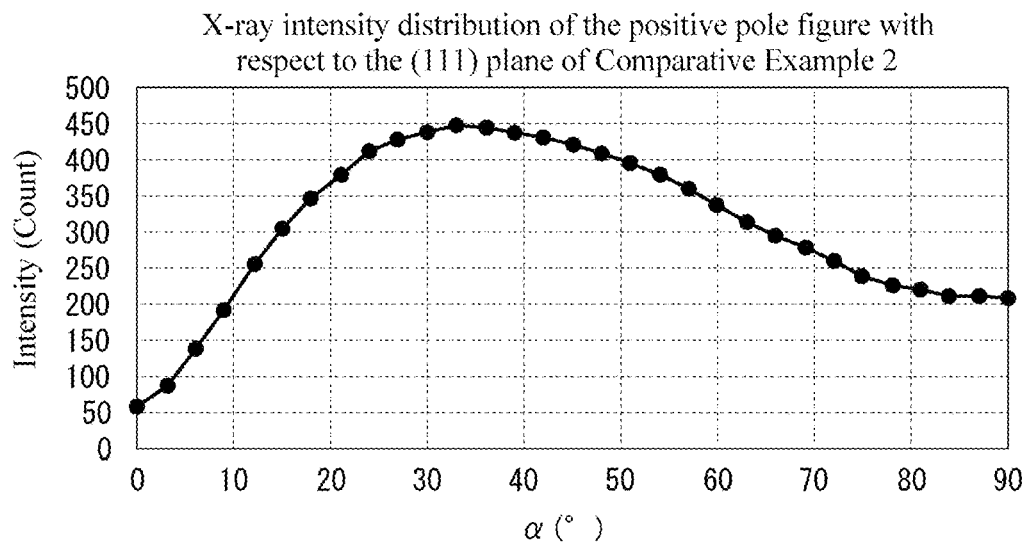
FIG. 7 is an example of an X-ray intensity distribution of the α axis of the positive pole figure with respect to the plane (111) in AlTiN of Comparative Example 2.
Figure 9:
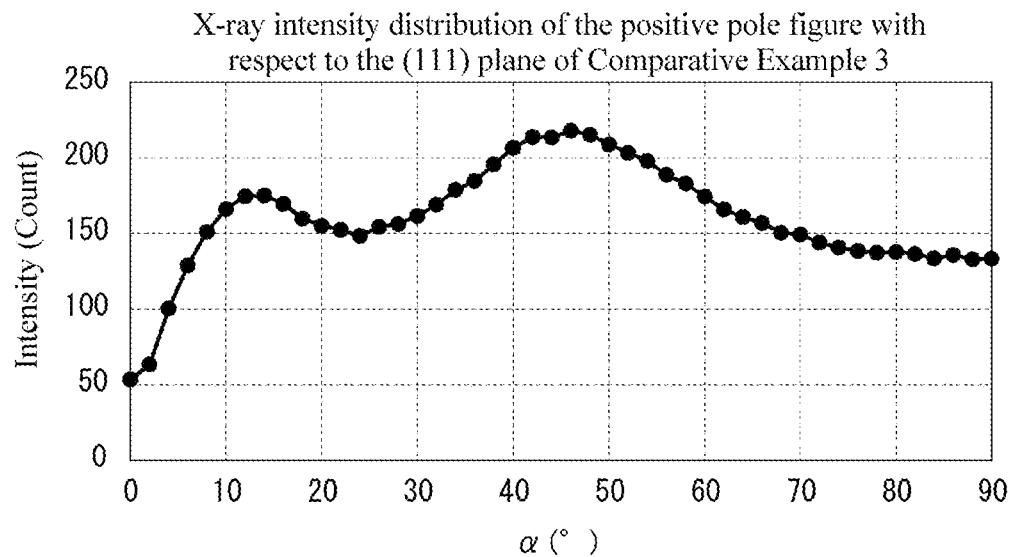
FIG. 9 is an example of an X-ray intensity distribution of the α axis of the positive pole figure with respect to the plane (111) in AlTiN of Comparative Example 3.

FIG. 1 shows the X-ray intensity distribution of the α axis of the positive pole figure with respect to the (111) plane of Example 1. FIG. 3 shows the X-ray intensity distribution of the α axis of the positive pole figure with respect to the (111) plane of Example 2. FIG. 5 shows the X-ray intensity distribution of the α axis of the positive pole figure with respect to the (111) plane of Comparative Example 1. FIG. 7 shows the X-ray intensity distribution of the α axis of the positive pole figure with respect to the (111) plane of Comparative Example 2. FIG. 9 shows the X-ray intensity distribution of the α axis of the positive pole figure with respect to the plane (111) of Comparative Example 3.

From FIGS. 1 and 3, it can be seen that the (111) planes of Examples 1 and 2 have maximum peak intensities at an α angle of 90°, the intensities are low in the α angle range of 0° to 70°, and strongly oriented in a narrow range of the α angle of 800 to 90°.

From FIGS. 5, 7, and 9, it is confirmed that the orientation of Comparative Examples 1 to 3 is different from that of Examples 1 and 2. The conditions for forming the hard coating films are the same in Example 1 and Comparative Example 1, but in Comparative Example 1, the hard coating film was provided on the intermediate film, so it is presumed that the crystal orientation of Comparative Example 1 was changed with respect to Example 1 due to the influence of the surface condition of the intermediate film. In an Al-rich film, the AlN having an hcp structure tends to increase, it is presumed that the surface condition of the base material under the hard coating film and the intermediate film significantly influences the orientation of the crystal structure.

Table 1 shows the peak intensity values read from the figures. The (111) plane of Example 1 exhibited a maximum intensity Ia (3562) at an a angle of 90°, and a maximum intensity in the α angle range of 0° to 70° was 330. The (111) plane of Example 1 was found to be 9% of the maximum intensity Ia in the α angle range of 0° to 70°, and the (111) plane was found to be strongly oriented at an α angle of 80° to 90°. That is, the (111) plane of Example 1 had an intensity in the α angle range of 0° to 70° of 30% or less of maximum intensity Ia and further 20% or less of Ia.

The (111) plane of Example 2 exhibited a maximum intensity Ia (859) at an α angle of 90°, and a maximum intensity in the α angle range of 0° to 700 was 233. The (111) plane of Example 2 was found to be 27% of the maximum intensity Ia in the α angle range of 0° to 70°, and the (111) plane was found to be strongly oriented in the α angle range of 80° to 90°. That is, the (111) plane of Example 2 had an intensity in the α angle range of 0° to 70° that was 30% or less of the maximum intensity Ia.

Figure 2:
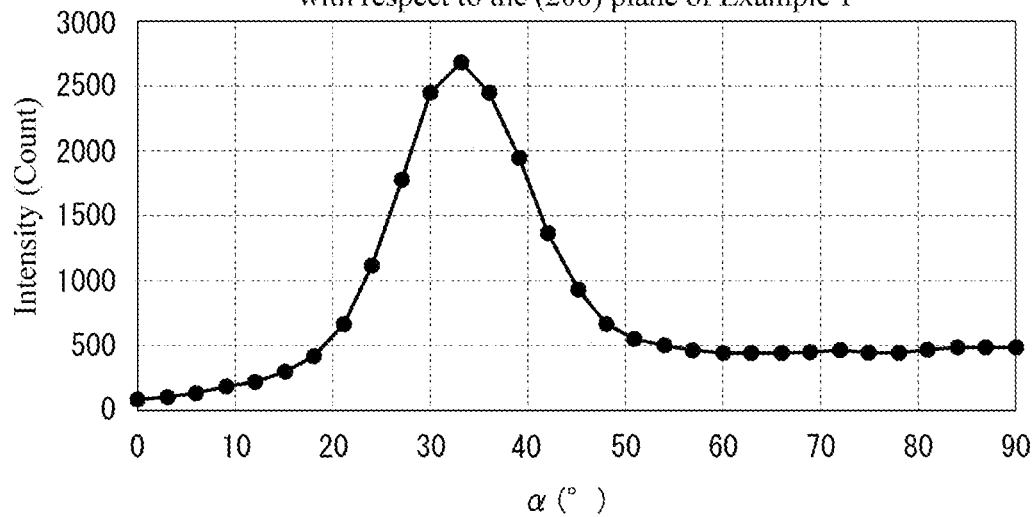
FIG. 2 is an example of an X-ray intensity distribution of the $\alpha$ axis of the positive pole figure with respect to the (200) plane in AlTiN of Example 1.
Figure 4:
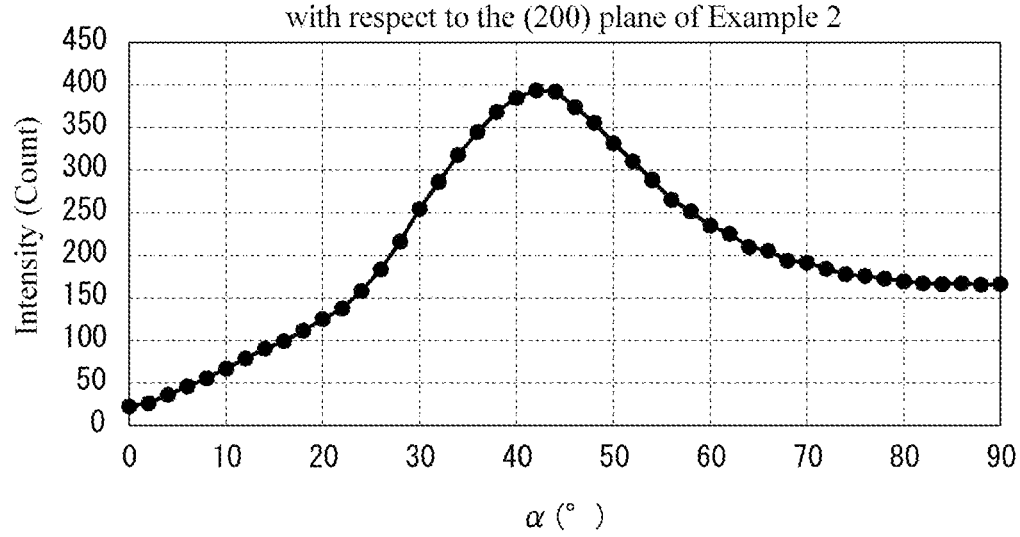
FIG. 4 is an example of an X-ray intensity distribution of the $\alpha$ axis of the positive pole figure with respect to the (200) plane in AlTiN of Example 2.
Figure 6:
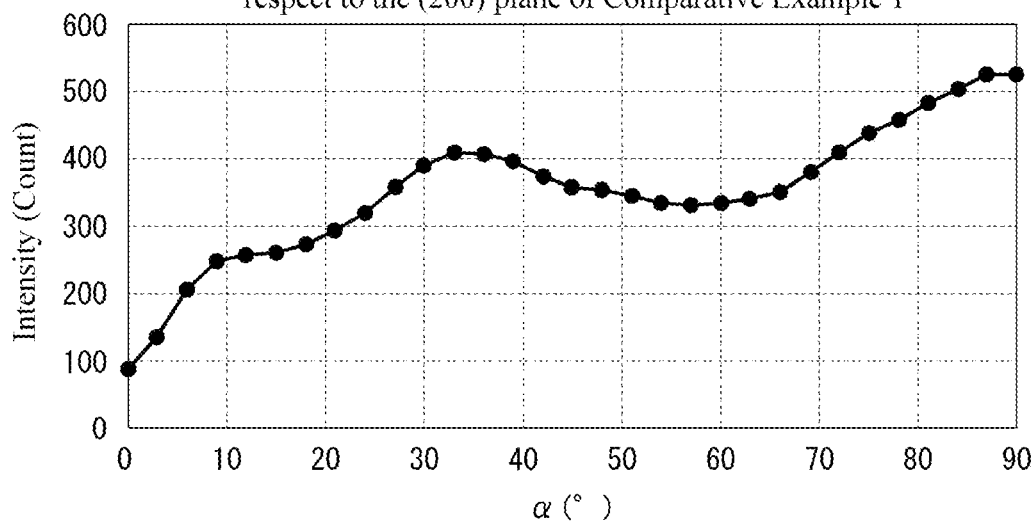
FIG. 6 is an example of an X-ray intensity distribution of the α axis of the positive pole figure with respect to the (200) plane in AlTiN of Comparative Example 1.
Figure 8:
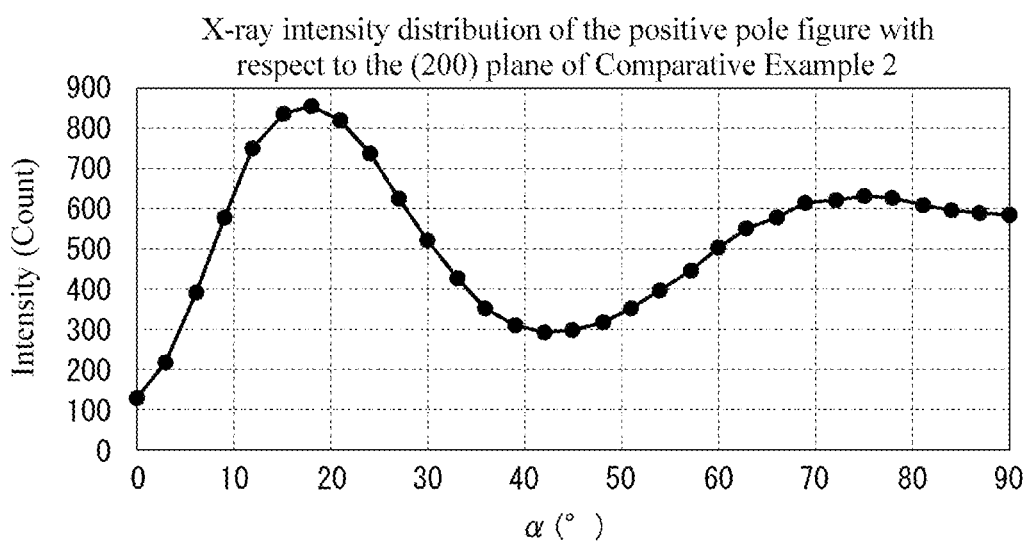
FIG. 8 is an example of an X-ray intensity distribution of the α axis of the positive pole figure with respect to the (200) plane in AlTiN of Comparative Example 2.
Figure 10:
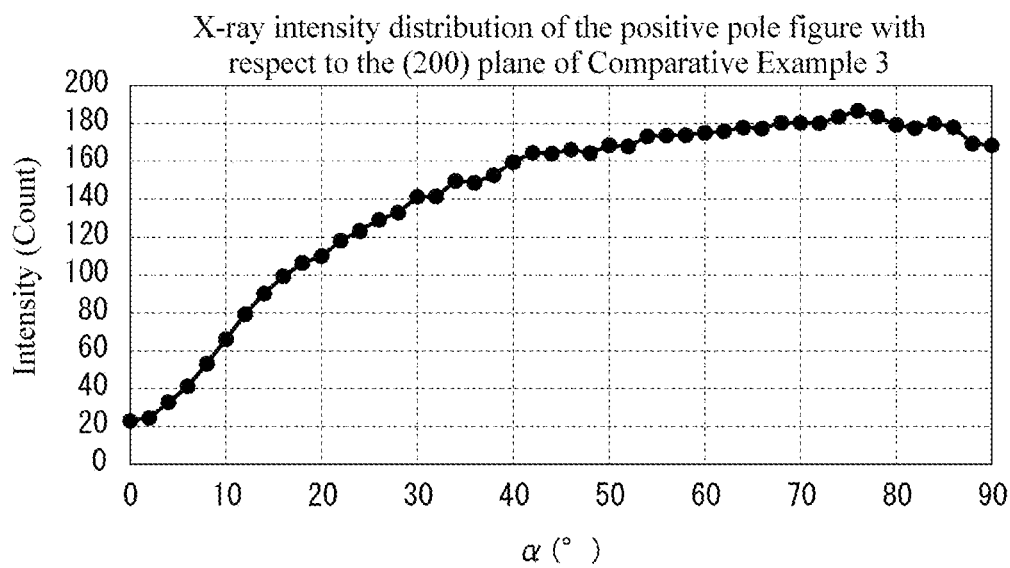
FIG. 10 is an example of an X-ray intensity distribution of the α axis of the positive pole figure with respect to the (200) plane in AlTiN of Comparative Example 3.
Figure 11:
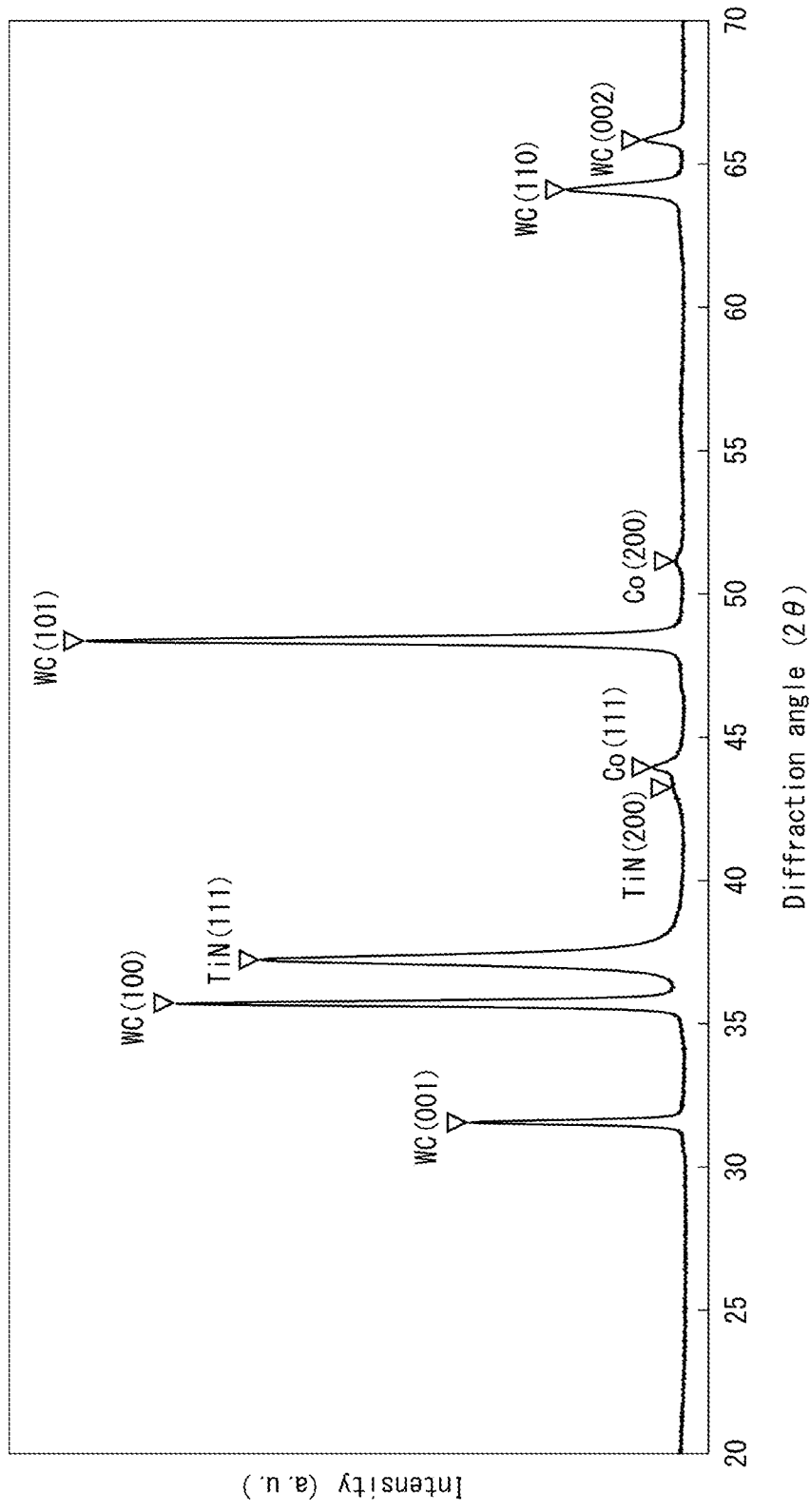
FIG. 11 is an example of the measurement results of XRD in AlTiN layer of Example 1.

FIG. 2 shows the X-ray intensity distribution of the α axis of the positive pole figure with respect to the (200) plane of Example 1. FIG. 4 shows the X-ray intensity distribution of the α axis of the positive pole figure with respect to the (200) plane of Example 2. FIG. 6 shows the X-ray intensity distribution of the α axis of the positive pole figure with respect to the (200) plane of Comparative Example 1. FIG. 8 shows the X-ray intensity distribution of the α axis of the positive pole figure with respect to the (200) plane of Comparative Example 2. FIG. 10 shows the X-ray intensity distribution of the α axis of the positive pole figure with respect to the (200) plane of Comparative Example 3.

From FIGS. 2 and 4, the (200) plane of the Examples 1 and 2 had a peak intensity at an α angle of 200 to 50°.

FIG. 1I shows an example of the measurement result of XRD in AlTiN film of Example 1. The AlTiN film of Example 1 was confirmed to have the maximum intensity of the peak intensity of the (111) plane of the face-centered cubic lattice structure. In addition, the peak intensities of AlN having an hcp structure were not confirmed in the XRD of the AlTiN films of Examples 1 and 2.

(Condition) Dry Processing
  Tools: Two-flute carbide ball end mill
  Model number: EPDBE 2010-6, ball radius 0.5 mm
  Cutting method: Bottom cutting
  Work materials: STAVAX (52HRC) (manufactured by Bailer Woode Holm Co., Ltd.)
  Cutting: Axial, 0.03 mm, radial, 0.03 mm
  Cutting speed: 67.8 m/min
  Feed per blade: 0.0135 mm/blade
  Cutting distance: 15 m
  Evaluation Method: After machining, the workpiece was observed with a scanning electron microscope at a magnification of 1000 times to measure the width of abrasion between the tool and the work material, and the portion with the largest abrasion width was used as the maximum wear width.

TABLE 2

|  | Maximum flank wear width (μm) |
|---|---|
| Example 1 | 12 |
| Example 2 | 13 |
| Comparative Example 1 | 15 |
| Comparative Example 2 | 15 |
| Comparative Example 3 | 17 |

In Examples 1 and 2, it was confirmed that the maximum wear width of the flank is small and the durability is excellent. In Examples 1 and 2 of the present invention, the (111) plane of the face-centered cubic lattice structure is strongly oriented in the α angle range of 80° to 90°, which is presumed to improve the durability of the tool.

The invention claimed is:

1. A coated tool comprising:
   a base material; and
   a hard coating film on the base material,
   wherein the hard coating film is a film deposited by arc ion plating or sputtering,
   the hard coating film is a nitride or carbonitride which contains aluminum (Al) of 65 atomic % or more and 90 atomic % or less and titanium (Ti) of 10 atomic % or more and 35 atomic % or less with respect to a total amount of metal (including metalloid) elements, and have a face-centered cubic structure, and
   wherein, in the X-ray intensity distribution of the α axis of the positive pole figure with respect to the (111) plane of the face-centered cubic structure, the hard coating film have a maximum intensity Ia in the α angle range of 80° to 90° and an intensity in the α angle range of 0° to 70° is 30% or less of the Ia.

2. The coated tool according to claim 1,
   wherein the intensity in the α angle range of 0° to 70° is 20% or less of the Ia.

3. The coated tool according to claim 1,
   wherein in the hard coating film, a peak intensity of the (111) plane of face-centered cubic lattice structure exhibits maximum intensity in the intensity profile of an X-ray diffraction or limited field diffraction pattern of transmission electron microscopy.

4. The coated tool according to claim 1,
   wherein the hard coating film has no peaks other than in the α angle range of 80° to 90° in the X-ray intensity distribution of the α axis of the positive pole figure with respect to the (111) plane of the face-centered cubic lattice structure.

5. The coated tool according to claim 1,
   wherein in the X-ray intensity distribution of the α axis of the positive pole figure with respect to the (200) plane of the face-centered cubic lattice structure of the hard coating film, the maximum intensity Ib is exhibited in the α angle range of 20° to 50°.

6. The coated tool according to claim 1,
   wherein in the X-ray intensity distribution of the α axis of the positive pole figure with respect to the (200) plane of the face-centered cubic lattice structure of the hard coating film, no peaks are exhibited other than in the α angle range of 20° to 50°.

7. The coated tool according to claim 1,
   wherein the hard coating film contains 0.20 atomic % or less of argon (Ar) with respect to a total amount of metal and non-metallic elements.

8. The coated tool according to claim 1,
   wherein the hard coating film has compressive residual stress.

9. The coated tool according to claim 1,
   wherein the hard coating film has 5 or less droplets having a circular equivalent diameter of 1 μm or more per 100 μm² in cross-sectional observation.

10. The coated tool according to claim 2,
    wherein in the hard coating film, a peak intensity of the (111) plane of face-centered cubic lattice structure exhibits maximum intensity in the intensity profile of an X-ray diffraction or limited field diffraction pattern of transmission electron microscopy.

11. The coated tool according to claim 2, wherein the hard coating film has no peaks other than in the α angle range of 80° to 90° in the X-ray intensity distribution of the α axis of the positive pole figure with respect to the (111) plane of the face-centered cubic lattice structure.

12. The coated tool according to claim 3, wherein the hard coating film has no peaks other than in the α angle range of 80° to 90° in the X-ray intensity distribution of the α axis of the positive pole figure with respect to the (111) plane of the face-centered cubic lattice structure.

13. The coated tool according to claim 2, wherein in the X-ray intensity distribution of the α axis of the positive pole figure with respect to the (200) plane of the face-centered cubic lattice structure of the hard coating film, the maximum intensity Ib is exhibited in the α angle range of 20° to 50°.

14. The coated tool according to claim 3, wherein in the X-ray intensity distribution of the α axis of the positive pole figure with respect to the (200) plane of the face-centered cubic lattice structure of the hard coating film, the maximum intensity Ib is exhibited in the α angle range of 20° to 50°.

15. The coated tool according to claim 2, wherein in the X-ray intensity distribution of the α axis of the positive pole figure with respect to the (200) plane of the face-centered cubic lattice structure of the hard coating film, no peaks are exhibited other than in the α angle range of 20° to 50°.

16. The coated tool according to claim 3, wherein in the X-ray intensity distribution of the α axis of the positive pole figure with respect to the (200) plane of the face-centered cubic lattice structure of the hard coating film, no peaks are exhibited other than in the α angle range of 20° to 50°.

17. The coated tool according to claim 2, wherein the hard coating film contains 0.20 atomic % or less of argon (Ar) with respect to a total amount of metal and non-metallic elements.

18. The coated tool according to claim 3, wherein the hard coating film contains 0.20 atomic % or less of argon (Ar) with respect to a total amount of metal and non-metallic elements.

19. The coated tool according to claim 2, wherein the hard coating film has compressive residual stress.

20. The coated tool according to claim 2, wherein the hard coating film has 5 or less droplets having a circular equivalent diameter of 1 μm or more per 100 μm$^2$ in cross-sectional observation.

* * * * *